May 3, 1966 L. R. DUNCAN, JR 3,249,871

CONSTANT FORWARD POWER CONTROL CIRCUIT FOR TRANSMISSION SYSTEM

Filed June 1, 1962

INVENTOR.
LONEY R. DUNCAN JR.
BY Moody and Harris
ATTORNEYS

United States Patent Office 3,249,871

Patented May 3, 1966

3,249,871

CONSTANT FORWARD POWER CONTROL CIRCUIT FOR TRANSMISSION SYSTEM

Loney R. Duncan, Jr., Marion, Iowa, assignor to Collins Radio Company, Cedar Rapids, Iowa, a corporation of Iowa Filed June 1, 1962, Ser. No. 200,028
8 Claims. (Cl. 325—186)

Figure 1:
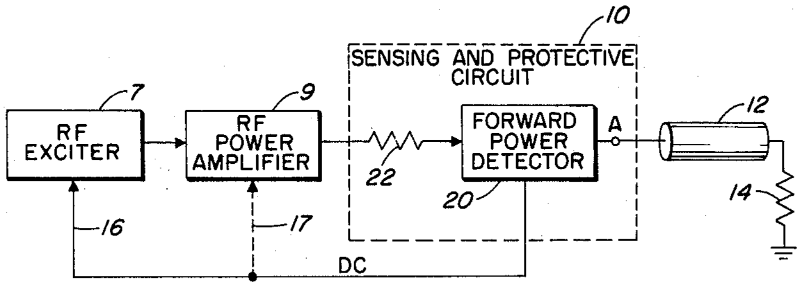

This invention relates to a constant forward power control system and more particularly to a system for optimumly maintaining constant forward power to thereby maintain constant delivered power to a given load impedance, independent of transmission line length.

It is oftentimes desirable, in some cases mandatory, that the R.F. power delivered be maintained constant. Such is the case, for example, where complex automatic antenna couplers must be tuned, since during a portion of the tuning sequence, conditions are likely to be such that the R.F. power source is presented with load impedances quite unlike those for which it was designed. In addition it is usually mandatory that a steady state condition exist during at least a portion of the tuning cycle, and in this condition, of course, it is essential that the R.F. power delived to the antenna coupler from the R.F. power amplifier be maintained constant in order to secure servo stability and setability, despite the fact that the antenna coupler input impedance may be considerably mismatched to the transmission line connecting it to the R.F. power amplifier.

While many circuits have ben proposed and/or utilized hereinbefore to automatically control voltage (or current) or establish a predetermined maximum level, no system has heretofore been available capable of maintaining a constant delivered power to a given load impedance, independent of transmission line length by monitoring constant forward power. Likewise, no control system now available is suitable for use between an antenna coupler and R.F. power amplifier to regulate the amount of power delivered to a mismatched load, regardless of the length of the interconnecting transmission line.

It is therefore an object of this invention to provide a constant forward power control system capable of regulating the amount of power delivered to a mismatched load regardless of the length of the interconnecting transmission line.

It is also an object of this invention to provide a constant forward power control system capable of providing constant forward power in order to maintain a constant delivered power to a given load impedance independent of transmission line length.

It is another object of this invention to provide a constant forward power control system having a sensing and protective circuit connected between an R.F. power amplifier and a transmission line, said sensing and protective circuit including detector and resistance means for sensing the incoming R.F. signal and providing a D.C. control voltage to maintain forward power constant at the output from said sensing and protective circuit, while at the same time providing protection for the power amplifier from load impedances presented if the transmission line is mismatched.

With these and other objects in view, which will become apparent to one skilled in the art as the description proceeds, this invention resides in the novel construction, combination and arrangements of parts substantially as hereinafter described and more particularly defined by the appended claims, it being understood that such changes in the precise embodiments of the herein disclosed invention may be included as come within the scope of the claims.

Figure 2:
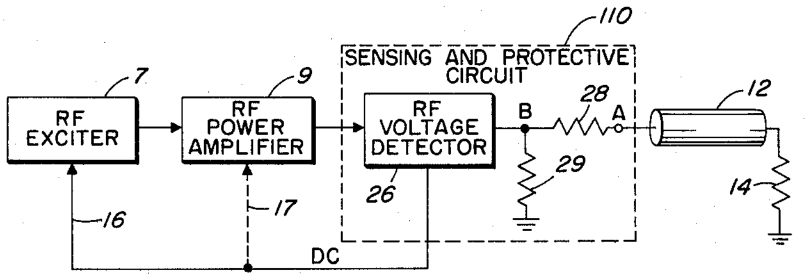
Figure 3:
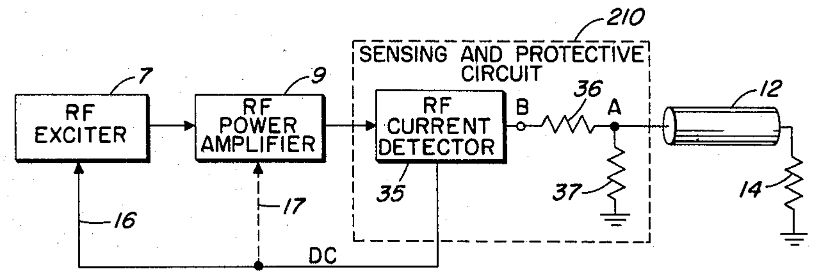

The accompanying drawings illustrate three complete examples of the invention constructed according to the best mode so far devised for the practical application of the principles thereof, and in which:

FIGURE 1 is a block and schematic diagram illustrating constant forward power control system of this invention in which the sensing and protective circuit therein includes a forward power detector;

FIGURE 2 is a block and selective diagram of a second embodiment of the constant forward power control system of this invention wherein the sensing and protective unit includes an R.F. voltage detector; and FIGURE 3, a block and schematic diagram of a third embodiment of the constant forward power control system of this invention wherein the sensing and protective circuit includes an R.F. current detector.

Referring now to the drawings, in which like numerals refer to like characters throughout, the numeral 7 designates an R.F. exciter, which exciter may be conventional and may have the magnitude of its produced output signal varied by a control D.C. voltage in conventional fashion, such as, for example, by biasing vacuum tubes or transistors in the signal path.

The output from R.F. exciter 7 is coupled to an R.F. power amplifier 9, which amplifier may likewise be conventional and, as is also conventional, has its gain controlled by a D.C. bias coupled to vacuum tubes or transistors used for amplification in the signal path. The output from the R.F. power amplifier 9 is then coupled through sensing and protective circuit 10 and through a length of transmission line 12 to a terminal load 14, which load may include, for example, a coupling circuit which, itself terminates by connection to an antenna (not shown).

An inverse D.C. feedback control voltage is derived in sensing and protective circuit 10 and this, as shown in the drawings, is fed back through lead 16 to R.F. exciter 7 to control the gain in conventional fashion as brought out hereinabove. As shown in dotted lines, a lead 17 may also connect the D.C. control voltage to R.F. power amplifier 9, if desired, to control its gain.

It is a well-known principle of transmission line theory that the power delivered to a terminal load from a transmission line is equal to the forward or incident power to the load minus that power reflected from the load. Since the percentages of forward and reflected power are a function of the load impedance compared to the characteristic impedance of the transmission line regardless of its length, it follows that in order to maintain a constant delivered power to a given load impedance, independent of transmission line length, there must be constant forward power.

It is therefore the purpose of sensing and protective circuit 10 to develop the necessary signal to maintain the forward power constant at the output of the sensing and protective circuit (designated as point A in the drawings).

To accomplish this, a conventional forward power detector 20, as shown in FIGURE 1, is inserted in the line to sense the R.F. signal. This forward power detector could, for example, be a calibrated directional watt meter which reads the forward component of power, which component may be defined as follows:

$$P_f=\frac{V_f^2}{Z_o}=I_f^2Z_o=V_fI_f$$

where $P_f$ represents constant forward power,
$V_f$ represents the forward component of voltage,
$Z_o$ represents the characteristic impedance of the transmission line, and
$I_f$ represents the forward component current.

This dector therefore produces a D.C. voltage which is a function of forward power and of a polarity to produce an inverse feedback control voltage to the R.F. exciter and/or the R.F. power amplifier, if so connected in the feedback path.

In addition, a resistor 22 is connected in series with forward power detector 20 in sensing and protective circuit 10. Resistor 22 acts as an isolation resistor to protect the power amplifier output network from the load impedances presented if transmission line 12 happens to be mismatched. Resistor 22, in fact, de-Q's the load reactance sufficiently to prevent resonances between the reactance and that of the output network elements, thus preventing a condition from existing where the power amplifier plate, or output, circuit either could not keep properly resonate or would be severely loaded.

Thus, circuit 10 protects the power amplifier in the backward direction by means of resistor 22 and also senses the R.F. signal in the forward direction by the forward power detector and responsive thereto develops a D.C. control voltage that is fed back to the preceding R.F. stages in order to maintain constant forward power at the output of the sensing and protective circuit 10 (point A). It is thus apparent that the constant forward power control system of this invention differs from a conventional automatic volume control (AVC) system, for example, in that although a D.C. control voltage is fed back to the R.F. exciter (and possibly to the power amplifier), the net result is the control of power rather than merely voltage or current.

The constant forward power control system, as shown in FIGURE 1, is particularly well suited for use with an automatically tuned coupler and a phasing type power amplifier circuit which contains little or no loading capability because of the minimum of power dissipation required in resistor 22 during the tuning cycle.

As shown in FIGURE 2, the constant forward power control system may also have a sensing and protective circuit 110 which includes an R.F. voltage detector 26, a resistor 28 connected in series with the output of said detector and the input of transmission line 12, and a parallel connected resistor 29 through which the output of said detector is connected to ground.

In the embodiment of this invention shown in FIGURE 2, resistors 28 and 29 are connected to the output of the detector (rather than the input as was resistor 22 in FIGURE 1). However, resistors 28 and 29, like resistor 22, serve as protection, or isolation, resistors for the power amplifier. For proper operation, resistor 28 is chosen to have a value equal to the characteristic impedance of the transmission line, while resistor 29 is chosen to have some convenient larger value, preferably about twice that of the characteristic impedance of the transmission line. By proper selection of the value of resistor 29, the impedance present at the output of the R.F. voltage detector (designated at point B in FIGURE 2) will be confined to a relatively small voltage standing wave ratio (VSWR) compared to that at the input to transmission line 12 (point A), thus again protecting the power amplifier circuits.

Voltage detector 26 may be conventional, and in conventional fashion produces a D.C. inverse feedback control voltage which is a function of the R.F. voltage appearing at the output of the detector (point B). It is another fundamental principle of transmission line theory that a constant voltage maintained at the input (point B) of a resistor, equal in value to the characteristic impedance of the series connected transmission line following, will produce constant forward power into that transmission line (at point A) regardless of its load impedance. Thus, as shown in FIGURE 2, the detector, by maintaining constant voltage at point B, also maintains constant forward power at point A regardless of the impedance load.

The embodiment of the constant forward power control system as shown in FIGURE 2 is well suited for use with power amplifier circuits which contain impedance loading capability because of the protection given by the dual resistor pad (connected in both series and shunt).

As shown in FIGURE 3, constant forward power control may also be realized with a sensing and protective circuit 210, which circuit includes an R.F. current detector 35 having its output connected with transmission line 12 by means of a resistor 36. Unlike the sensing and protective circuits shown in FIGURE 2, however, when an R.F. current detector is used in the sensing and protective circuit, the shunt, or parallel resistor 37, is connected at the output of the circuit, that is at the input to the transmission line (designated as point A in the drawings). As shown in FIGURE 3, resistor 37 is connected from point A to ground.

Like sensing and protective circuit 110 of FIGURE 2, resistors 36 and 37 of sensing and protective circuit 210 also serve as protection pads for the power amplifier. Unlike the resistors shown in the sensing and protective circuit of FIGURE 2, however, resistor 36 is chosen to be equal in value to one-half of the characteristic impedance of the transmission line, while resistor 37 is chosen to have a value equal to that of the characteristic impedance of the transmission line. With the proper selection of resistor 36, the impedance at the output of R.F. current detector 35 (point B as shown in FIGURE 3) can be confined within a relatively low voltage standing wave ratio (VSWR) compared to that at the input to transmission line 12 (point A), thus protecting the power amplifier circuits preceding the sensing and protective circuit.

Current detector 35 may also be conventional and, in conventional fashion, produces a D.C. inverse feedback control voltage that is a function of the series current flowing at the output of the detector (point B).

It is another fundamental principle of transmission line theory that a constant current, maintained into a parallel combination of a transmission line and a resistor having a value equal to the characteristic impedance of said transmission line, will also maintain constant forward power to the transmission line regardless of its load impedance. Thus, as shown in FIGURE 3, the current detector maintains a constant R.F. current at point B (and through the parallel impedace at point A), and hence constant forward power to the transmission line at point A.

The embodiment of the invention as shown in FIGURE 3 is well suited for use with a loading type power amplifier because of the protection afforded by the series and shunt connected resistor pad.

In view of the foregoing, it should be obvious to those skilled in the art that this invention provides a system capable of maintaining constant delivered power to a given load impedance, independent of transmission line length, by maintaining constant forward power. In this respect, it is to be noted that the percentages of forward and reflected power are a function of the load impedance compared to the characteristic impedance of the transmission line regardless of its length. As brought out hereinabove, the system is therefore ideally suited for use with equipments such as automatic antenna couplers where the load impedances may differ at times to quite an extent, and where a steady state condition is also necessary in order to insure servo stability and setability.

What is claimed as my invention is:

1. A forward power control system, comprising: a radio frequency (R.F.) exciter; R.F. power amplifier means connected to said exciter for receiving the output therefrom; a terminal load; a transmission line one end of which is connected to said terminal load; and a sensing and protective circuit connected in series between said R.F. power amplifier means and the other end of said transmission line for sensing the R.F. signal from said power amplifier and in response thereto maintaining the forward power coupled to said other end of said transmission line at a constant predetermined value.

2. A forward power control system, comprising: a radio frequency (R.F.) exciter; R.F. power amplifier means connected with said exciter for receiving the output therefrom; a terminal load; a transmission line one end of which is connected to said terminal load; and a sensing and protective circuit connected between said R.F. amplifier means and the other end of said transmission line, said sensing and protective circuit including resistance means to protect said power amplifier means against load impedance presented by a mismatched transmission line and detector means for monitoring the R.F. signal and in response thereto deevloping an inverse control D.C. voltage that is fed back to said R.F. exciter whereby forward power is maintained constant at said other end of said transmission line.

3. The constant forward power control system of claim 2 wherein said detector means is a forward power detector and said resistance means is connected in series between said R.F. power amplifier and said detector means.

4. The constant forward power control system of claim 2 wherein said detector means is an R.F. voltage detector and said resistance means includes a first resistor connected in series between said R.F. voltage detector and said other end of said transmission line, and a second resistor one side of which is connected to ground and the other side of which is connected to the junction of said R.F. voltage detector and said first resistor.

5. The constant forward power control system of claim 2 wherein said detector means is an R.F. current detector and said resistance means includes a first resistor connected in series between said R.F. current detector and said other end of said transmission line, and a second resistor one side of which is connected to ground and the other side of which is connected to the junction of said second resistor and said other end of said transmission line.

6. A forward power control system, comprising: a radio frequency (R.F.) exciter; an R.F. power amplifier; a transmission line; a terminal load connected to one end of said transmission line; a sensing and protective circuit including a resistor connected to the R.F. power amplifier at the output side thereof and a forward power detector connected between the other end of said transmission line and said resistor, said resistor protecting said power amplifier from load impedances presented by a mismatched transmission line and said forward power detector sensing the R.F. signal coupled through said resistor and responsive thereto generating an inverse D.C. control voltage for maintaining forward power constant at the output of said forward power detector; and means for coupling said generated inverse D.C. control voltage back to said R.F. exciter.

7. A constant forward power control system, comprising: a radio frequency (R.F.) exciter; an R.F. power amplifier; a transmission line; a terminal load connected to one end of said transmission line; a sensing and protective circuit connected between said R.F. power amplifier and the other end of said transmission line, said sensing and protective circuit including an R.F. voltage detector, a first resistor connected between the output of said R.F. voltage detector and said other end of said transmission line, and a second resistor connected between the output of said R.F. voltage detector and ground, said R.F. voltage detector sensing the R.F. voltage coupled from said power amplifier and generating an inverse D.C. control voltage in response thereto, said first resistor having a value substantially equal to the characteristic impedance of said transmission line and said second resistor having a value substantially equal to twice the characteristic impedance of said transmission line; and means for coupling said inverse D.C. control voltage to said R.F. exciter.

8. A constant forward power control system, comprising: a radio frequency (R.F.) exciter; an R.F. power amplifier; a transmission line; a terminal load connected to one end of said transmission line; a sensing and protective circuit connected between said R.F. power amplifier and the other end of said transmission line, said sensing and protective circuit including an R.F. current detector, a first resistor connected between the output of said R.F. current detector and said other end of said transmission line, and a second resistor connected between ground and the junction of said first resistor and said other end of said transmission line, said R.F. current detector sensing the R.F. current coupled from said R.F. power amplifier and generating an inverse D.C. control voltage in response thereto, said first resistor having a value substantially equal to the characteristic impedance of said transmission line, and said second resistor having a value substantially equal to one-half the characteristic impedance of said transmission line; and means for coupling said inverse D.C. control voltage to said R.F. exciter.

References Cited by the Examiner

UNITED STATES PATENTS

| | | | |
|---|---|---|---|
| 2,793,292 | 5/1957 | Wolff | 331—183 X |
| 2,896,073 | 7/1959 | Westphal | 325—186 X |

FOREIGN PATENTS

| | | |
|---|---|---|
| 104,666 | 7/1938 | Australia. |

DAVID G. REDINBAUGH, *Primary Examiner.*

KATHLEEN H. CLAFFY, CHESTER L. JUSTUS, *Examiners.*

R. E. BERGER, J. W. CALDWELL, *Assistant Examiners.*